United States Patent
Chandrasekar et al.

(10) Patent No.: US 7,680,764 B2
(45) Date of Patent: Mar. 16, 2010

(54) PARALLEL POPULATION OF AN XML INDEX

(75) Inventors: Sivansankaran Chandrasekar, Palo Alto, CA (US); Anh-Tuan Tran, Vacaville, CA (US); Ravi Murthy, Fremont, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 266 days.

(21) Appl. No.: 11/472,837

(22) Filed: Jun. 21, 2006

(65) Prior Publication Data

US 2007/0299811 A1    Dec. 27, 2007

(51) Int. Cl.
    *G06F 17/30* (2006.01)
(52) U.S. Cl. .......................................... 707/2
(58) Field of Classification Search ........................ None
    See application file for complete search history.

(56) References Cited

U.S. PATENT DOCUMENTS

| | | | | |
|---|---|---|---|---|
| 2005/0004891 A1* | 1/2005 | Mahoney et al. | ............... | 707/3 |
| 2005/0091188 A1* | 4/2005 | Pal et al. | ........................ | 707/1 |
| 2005/0192809 A1* | 9/2005 | Dodrill et al. | ............ | 704/270.1 |
| 2005/0267871 A1* | 12/2005 | Marchisio et al. | ............... | 707/3 |
| 2006/0100989 A1* | 5/2006 | Chinchwadkar et al. | ....... | 707/3 |

OTHER PUBLICATIONS

Drake, Mark D., "Managing Content with Oracle XML DB," Oracle White Paper, Mar. 2005, 37 pages.
Votsch, Victor et al., "Oracle XML DB: Uniting XML Content and Data," Seybold Consulting, Mar. 2002, 14 pages.

* cited by examiner

*Primary Examiner*—Don Wong
*Assistant Examiner*—Belinda Xue
(74) *Attorney, Agent, or Firm*—Hickman Palermo Truong & Becker LLP; Deborah L. Caswell

(57) ABSTRACT

Populating an XML index is parallelized, providing both inter-document and intra-document parallelism, by using multiple pull-type parser processes to parse respective XML documents in parallel and to call respective 'instances' of the function that generates the index entries based on parsed XML node information. The function is configured to operate according to a cursor-type interface model, whereby each function instance can operate on one node at a time in a controlled pull manner rather than in an uncontrolled streaming manner. Hence, the index load procedure flow can be in the control of an application or routine, via the pull parsers, rather than in the control of a serial stream-based parser.

26 Claims, 5 Drawing Sheets

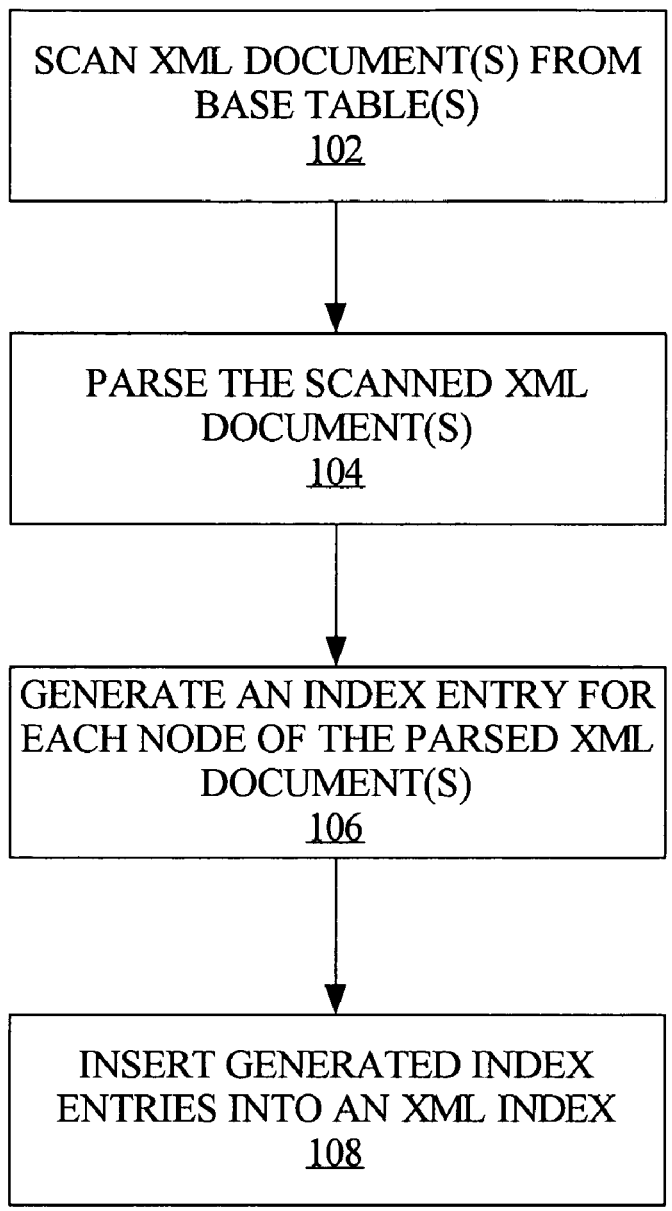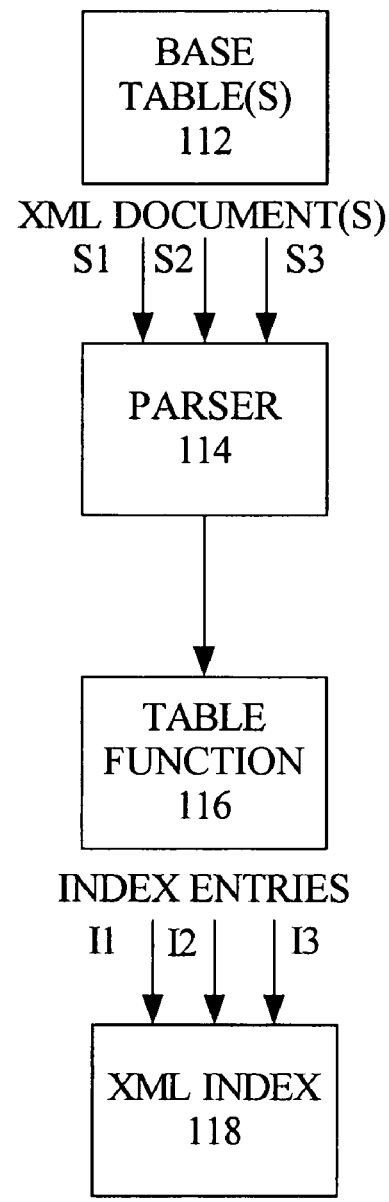
*FIG. 1A*  *FIG. 1B*

PARALLEL POPULATION OF AN XML INDEX

FIELD OF THE INVENTION

The present invention relates generally to data management and, more specifically, to techniques for populating an XML index in parallel in a database management system (DBMS).

BACKGROUND

Use of the Extensible Markup Language (XML) has become a popular and useful technique for representing and exchanging information of any kind, such as exchanging information among computer program applications and services, because XML data is self-descriptive (i.e., it contains tags along with data). Consequently, effective and efficient storage and manipulation of XML data has likewise become useful and necessary. Thus, some databases have been augmented to support the storage and manipulation of and access to XML data.

In recent years, there are many database systems that allow storage and querying of XML data. Though there are many evolving standards for querying XML, all of them include some variation of XPath. However, database systems are usually not optimized to handle XPath queries and their query performance leaves much to be desired. A mechanism for indexing paths, values and order information in XML documents is described in U.S. patent application Ser. No. 10/884,311 filed by SIVASANKARAN CHANDRASEKARAN et al., entitled "INDEX FOR ACCESSING XML DATA" ("the Chandra application"), the entire content of which is incorporated by reference in its entirety for all purposes as if fully disclosed herein. However, this index can be large and should be loaded efficiently, especially when the set of XML documents being indexed is also large. For example, it is not uncommon for an XML database to store and manage millions of XML documents whose sizes could be on the order of megabytes.

With most database systems, the loading of these indexes is not optimized to take into account parallelism techniques. Thus, this lack of parallelism leads to extracting each node information from the XML documents and populating the XML index in a serial fashion, an approach that does not scale well when the document set is large. Even in systems that do take limited advantage of parallelism techniques, for large XML documents there is no parallelism among different XML nodes within the same XML document. For example, various parallelism techniques may be employed to parallelize scanning the base data structures in which XML documents are stored (e.g., as part of the base structure creation process) and to parallelize inserting entries into the XML index (e.g., as part of the index creation process). However, such approaches are limited in their scope and effectiveness because such approaches still do not completely overcome processing bottlenecks in the context of the index loading procedure.

Hence, based on the foregoing, there is a need for techniques for efficiently and scalably loading XML indexes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a flow diagram that illustrates a method for loading an XML index;

FIG. 1B is a block diagram that illustrates functional components that may be used to perform corresponding steps illustrated in FIG. 1A;

DETAILED DESCRIPTION OF EMBODIMENTS OF THE INVENTION

Figure 2:
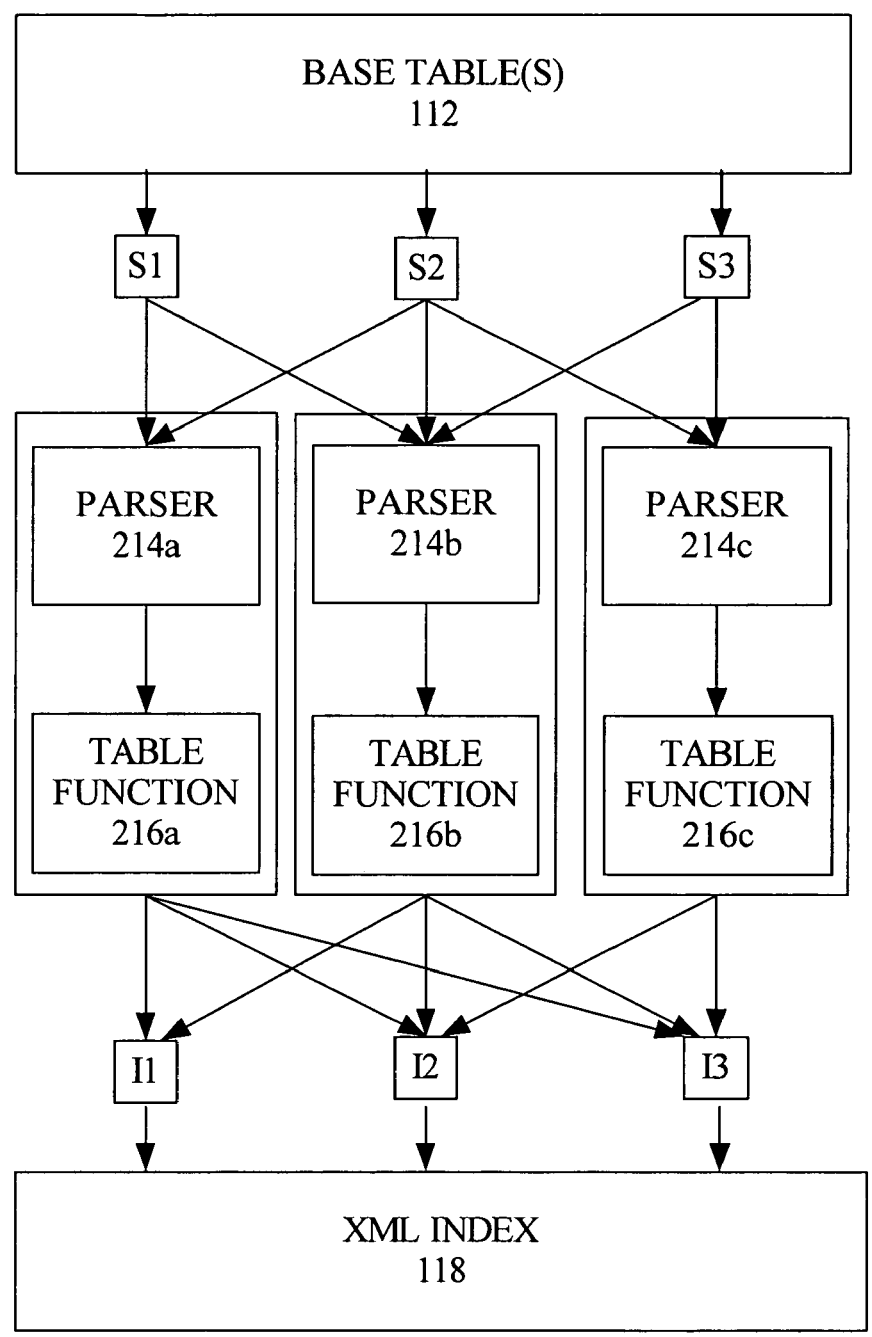
FIG. 2 is a block diagram that illustrates functional components that may be used to load an XML data index in parallel, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview of Embodiments

Techniques are described for loading an XML index in parallel, which means populating the index using multiple parallel processes. Populating an XML index involves, generally, (a) scanning one or more base tables in which XML documents are stored, (b) parsing each XML document, (c) inputting parsed XML node information to a function that generates corresponding XML index entries, and (d) inserting the entries into the index. Parallel processing can be used at each of the foregoing layers of processing, where various techniques can generally be used to parallelize the (a) base table scan and (d) index entry insert layers, in conjunction with techniques described herein for parallelizing the (b) document parse and (c) index entry generate layers. Hence, both inter-document parallelism and intra-document parallelism are enabled.

According to one embodiment, multiple pull-type parser processes are used to parse respective XML documents in parallel and to call respective 'instances' of the function that generates the index entries based on parsed XML node information. Consequently, the index load procedure is parallelized beyond parallel scan and insert operations, and the parse/function layers no longer operate as a potential single-point bottleneck to the index load procedure. According to one embodiment, the function is enabled to operate in a cursor-type access or interface model, whereby each function instance can operate on one node at a time in a controlled pull manner rather than in an uncontrolled streaming manner.

Hence, the index load procedure flow can be in the control of an application or routine, via the pull parsers, rather than in the control of a serial stream-based parser (e.g., SAX parser).

Operating Environment-Storage System

A database system typically comprises one or more clients that are communicatively coupled to a database server that is connected to a shared database. "Database server" may refer collectively to a cluster of server instances and machines on which the instances execute. Generally, a server is combination of integrated software components and an allocation of computational resources, such as memory, a node, and processes on the node for executing the integrated software components on a processor, where the combination of the software and computational resources are dedicated to providing a particular type of function on behalf of clients of the server.

Among other functions of database management, a database server governs and facilitates access to a particular database, processing requests by clients to access the database. In order for a client to interact with a server, a session is established for the client. A session, such as a database session, is a particular connection established from a client to a server, such as a database server. Through a session, the client can issue a series of requests (e.g., requests for data and/or metadata) to the database server.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command that is sent from a database application to a database server contains an original statement of the database command. For the database server to process the commands, the commands must conform to a database language supported by the database server. One non-limiting database language supported by many database servers is known as the Structured Query Language (SQL).

Generally, data is stored in a database in one or more data containers, each container contains records, and the data within each record is organized into one or more fields. In relational database systems, the data containers are typically referred to as tables, the records are referred to as rows, and the fields are referred to as columns. In object oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

A relational database system may be extended to provide native support for storage, management, and query of (and thus function as a repository for) particular types of data. For example, a traditional relational database system may be augmented with features and technologies to enable storage of XML documents directly in the database, and access to such XML data in either an XML-centric (e.g., using XPath and the XQuery query language) or a relational-centric (e.g., using the SQL query language) manner. Such a repository is at times referred to as an XML repository or an XML database (i.e., "XDB").

An XML Index

As mentioned, the Chandra application describes a mechanism for indexing paths, values and order information in XML documents, which may be used regardless of the format and data structures used to store the actual XML data. For example, the actual XML data can reside in structures within or outside of a database, in any form, such as CLOB (character LOB storing the actual XML text), O—R (object relational structured form in the presence of an XML schema), or BLOB (binary LOB storing some binary form of the XML).

The techniques described in the Chandra application involve using a set of structures, which collectively constitute an index, for accessing XML data. According to one embodiment, the index (referred to herein as an "XML index") includes three logical structures: a path index, an order index and a value index. In one embodiment, all three logical structures reside in a single table, referred to herein as the PATH_TABLE. The most commonly used parts of the XPath query language include (a) navigational (parent-child-descendent) access and (b) predicates based on values. By virtue of tracking paths, value and order information, the XML index can be used to satisfy both these access methods effectively. However, as mentioned, the loading of such XML indexes is not typically optimized to take into account parallelism techniques that eliminate processing bottlenecks.

Loading an XML Data Index, Generally

Herein, the terms "populating" and "loading" are used interchangeably in reference to procedures for initially inserting entries into an index on XML data stored in any form in a database. There are more steps to loading an XML index than merely inserting entries into the index, as follows.

FIG. 1A is a flow diagram that illustrates a method for loading an XML index. FIG. 1B is a block diagram that illustrates functional components that may be used to perform corresponding steps illustrated in FIG. 1A.

At block 102, one or more XML documents are scanned from one or more base tables. In one implementation of an XML database, a base table is used to store one XML document per row. Thus, each of multiple parallel processes (S1, S2, S3) can concurrently scan a respective row from a base table 112 and provide the corresponding XML document to an XML parser 114 for parsing. The scan procedure can be parallelized by specifying parallel scan processing, and a degree of parallelism, in the base table create statement.

At block 104, the one or more XML documents scanned from the base table are parsed. For example, any XML parser 114, such as a SAX (Simple API for XML) or other XML parser, can be used to parse the XML documents into their constituent nodes. While parsing an XML document, parser 116 causes a table function 116 to execute based on parsed node information for respective nodes of the XML document. Regardless of how many XML documents are concurrently scanned and sent to the parser 114 by the multiple scan processes, the single instance of the parser 114 is only capable of parsing one document at a time.

At block 106, an index entry is generated for each node of the parsed XML document. For example, table function 116 generates the XML index entries for each indexed node from each of one or more scanned XML documents, based on the node information passed to the table function 116 from parser 114. For example, table function 116 generates a row (e.g., the PathID, OrderKey, and Value described in the Chandra application) of an XML index (e.g., the Path Table of the Chandra application) for each indexed node (e.g., for XML elements, attributes, text nodes etc.). However, regardless of how many XML documents are concurrently scanned and sent to the parser 114 by the multiple scan processes, the single instance of the table function 116 is only capable of generating index entries for one document at a time.

At block 108, the index entries generated at block 106 are inserted into the XML index. For example, each of multiple parallel processes (I1, I2, I3) can concurrently insert index entries into XML index 118. Similar to the parallel scan processes, the insert procedure can be parallelized by specifying parallel insert processing, and a degree of parallelism, in the XML index (e.g., PATH_TABLE) create statement. However, because the parser 114 and table function 116 are only capable of processing one XML document at a time, each of the multiple insert processes is only used to process one document at a time.

The method of FIG. 1A is illustrated as utilizing multiple processes to scan the base table 112 in parallel and multiple processes to insert entries into XML index 118. However, a single instance of parser 114 and table function 116 can lead to a processing bottleneck because the single instances are limited as to how quickly the parser 116 can parse a given XML document and how quickly the table function 116 can generate index entries from corresponding node information. Consequently, the method illustrated in FIG. 1A is not entirely parallelized because it utilizes parallel processes for scanning base tables and inserting rows into the index, but utilizes only a single process at the parse and function layers. Therefore, eliminating the bottleneck by parallelizing the parsing and entry generating (i.e., table function) operations provides true parallelism throughout the entire index load procedure.

Loading an XML Data Index in Parallel

FIG. 2 is a block diagram that illustrates functional components that may be used to load an XML data index in parallel, according to an embodiment of the invention.

As with the architecture illustrated in FIG. 1B, the architecture of FIG. 2 depicts multiple scan processes S1, S2, S3 retrieve XML documents from one or more base table 112, and multiple insert processes I1, I2, I3 inserting entries into XML index 118. However, the architecture of FIG. 2 differs from the architecture of FIG. 1B in that FIG. 2 depicts multiple instances of a pull parser, 214a, 214b, 214c, and corresponding instances of table functions, 216a, 216b, 216c. Each table function 216a, 216b, 216c is an instance of the same table function, which generates index entries based on node information for insertion into XML index 118. Each parser/function instance is associated with a corresponding parallel process, and the multiple parser/function processes provide enhanced parallelism, in comparison with the architecture of FIG. 1B, for an index load procedure. Consequently, the parser/function procedure is no longer a potential single point bottleneck in the index load procedure.

According to one embodiment, if multiple XML documents are being processed in parallel (inter-document parallelism) for loading an XML index, a single process performs the work associated with each of the scan, parser/function, and insert layers. For example, a first process P1 handles the scan, parse, index entry generation, and insert operations for XML document D1; a second process P2 handles the scan, parse, index entry generation, and insert operations for XML document D2; and so on. However, if only one XML document is being processed at a time, then flow control may pass from one process to another process. For example, a single scan process S1 may scan the base table for a single XML document D1, parse D1, and dispatch node information to multiple slave processes SP1, SP2, etc. for generation of corresponding index entries and insertion into the XML index. Thus, a single master process may receive and parse a given XML document and dispatch the node information to any number of slave process for the remainder of the index load procedure, which provides intra-document parallelism via multiple parallel processes handling the index entry generation and insertion.

The number of scan processes, parser/function processes, and insert processes depicted in FIG. 2 is arbitrary and for purposes of a non-limiting example. Thus, the number of processes at each layer of the parallel index load architecture may vary from implementation to implementation and, therefore, is not limited to three processes per layer. Furthermore, the number of processes used at one layer of the procedure need not be equal to the number of processes at any other layer of the procedure.

As depicted in FIG. 2, each scan process (S1, S2, S3) is capable of sending XML documents from base table 112 to any of the parser/table function processes 214a/216a, 214b/216b, 214c/216c. However, typically only one scan process works on a given XML document. Upon receiving an XML document, each parser 214a, 214b, 214c parses the document and sends node information to a corresponding table function 216a, 216b, 216c for generation of corresponding index entries therefrom. For example, each table function 216a, 216b, 216c generates a row (e.g., the PathID, OrderKey, and Value described in the Chandra application) of the XML index 118 (e.g., the Path Table of the Chandra application) for each indexed node (e.g., for XML elements, attributes, text nodes etc.).

As depicted in FIG. 2, each insert process (I1, I2, I3) is capable of receiving XML node information from each table function 216a, 216b, 216c, according to one embodiment. Therefore each insert process is capable of inserting node index entries corresponding to any given XML document from the base table 112. Consequently, index entries for a given XML document can be concurrently loaded by multiple insert processes in parallel (referred to herein as intra-document parallelism), and index entries for multiple XML documents can be concurrently loaded by multiple insert processes in parallel (referred to herein as inter-document parallelism). As discussed above, a respective process may handle all the processing for a given document of multiple documents being concurrently processed, or a single scan and parser master process may dispatch node information to multiple table function and insertion slave processes.

Use of Pull Parsers

According to one embodiment, parsers 214a, 214b, 214c are pull-type parsers (referred to herein as "pull parser"), which operate in a "pull" manner rather than a streaming or "push" manner. Each of the pull parsers 214a, 214b, 214c calls a corresponding instance of the table function 216a, 216b, 216c while parsing an XML document received from one of the scan processes S1, S2, S3. For example, an application or routine for loading an XML index 118 may execute in a loop and call or command the pull parsers to pull the next value (e.g., index entry), repeatedly, for passing to the insert processes I1, I2, I3 for insertion into the XML index 118.

With use of pull parsers 214a, 214b, 214c, the application controls the flow of the index load procedure. This is in contrast to use of a SAX or other stream-based "push" parser for the index load procedure, in which the push parser controls the flow of the procedure. Consequently, the heightened parallelism provided by the architecture of FIG. 2 is more manageable and controllable than would be the case with a push parser. Furthermore, the architecture of FIG. 2 does not require a large buffer, and the associated management of the buffer, to buffer the parser/table function outputs, as would be the case with use of a push parser. For example, with use of a push parser, when the insert processes need a row for insertion into the XML index, then the push parser is invoked, which causes the push parser to continuously push out row values. This pushing of rows would cause a mismatch with the insert pull processes. By contrast, with use of parallel pull parsers in the architecture depicted in FIG. 2, when an insert process I1, I2, I3 needs a row for insertion into XML index 118, the insert process calls the parser/table function layer for a row. If a row is available (e.g., from a function output queue), then the row is provided to the calling insert process. If a row is not available, then the parser/table function layer calls for another XML document from the scan processes S1, S2, S3.

Furthermore, table functions 216a, 216b, 216c are configured to operate with a cursor-type of data access and processing. With the table function operating off a cursor, the function is configured to operate on one node at a time, in a controlled manner. For example, a select statement associated with rows from the base table 112 is included in, or expressed in, the table function statement, in a cursor mode of selection. For example, the index load procedure may be invoked with a statement as follows:

```
INSERT into PATH_TABLE
SELECT *
FROM TABLE(F(CURSOR(select * from base_table))).
```

Method for Loading an XML Data Index in Parallel

As mentioned, when the XML index is built, the PATH_TABLE needs to be populated with node entries, which could correspond to XML elements, attributes, text nodes etc. In parallel loading of an XML index, the process performing the parse/decode of the XML data is referred to as the "master" process or "coordinator" process. There is one "master" process and many "slave" processes. The master process is responsible for parsing the XML document and obtaining XML nodes to be inserted. When such a node is ready, it can be dispatched to a slave process that is the least busy process. The master process decides this based on a number of factors including the workload of the slaves and the rate of incoming nodes.

Using the techniques described herein, both inter-document parallelism and intra-document parallelism can be achieved. Inter-document parallelism is obtained because different documents can be handled by one of multiple processes in parallel. Further, because every XML node for a given XML document may be dispatched to an appropriate one of multiple processes, intra-document parallelism is also achieved.

Figure 3A:
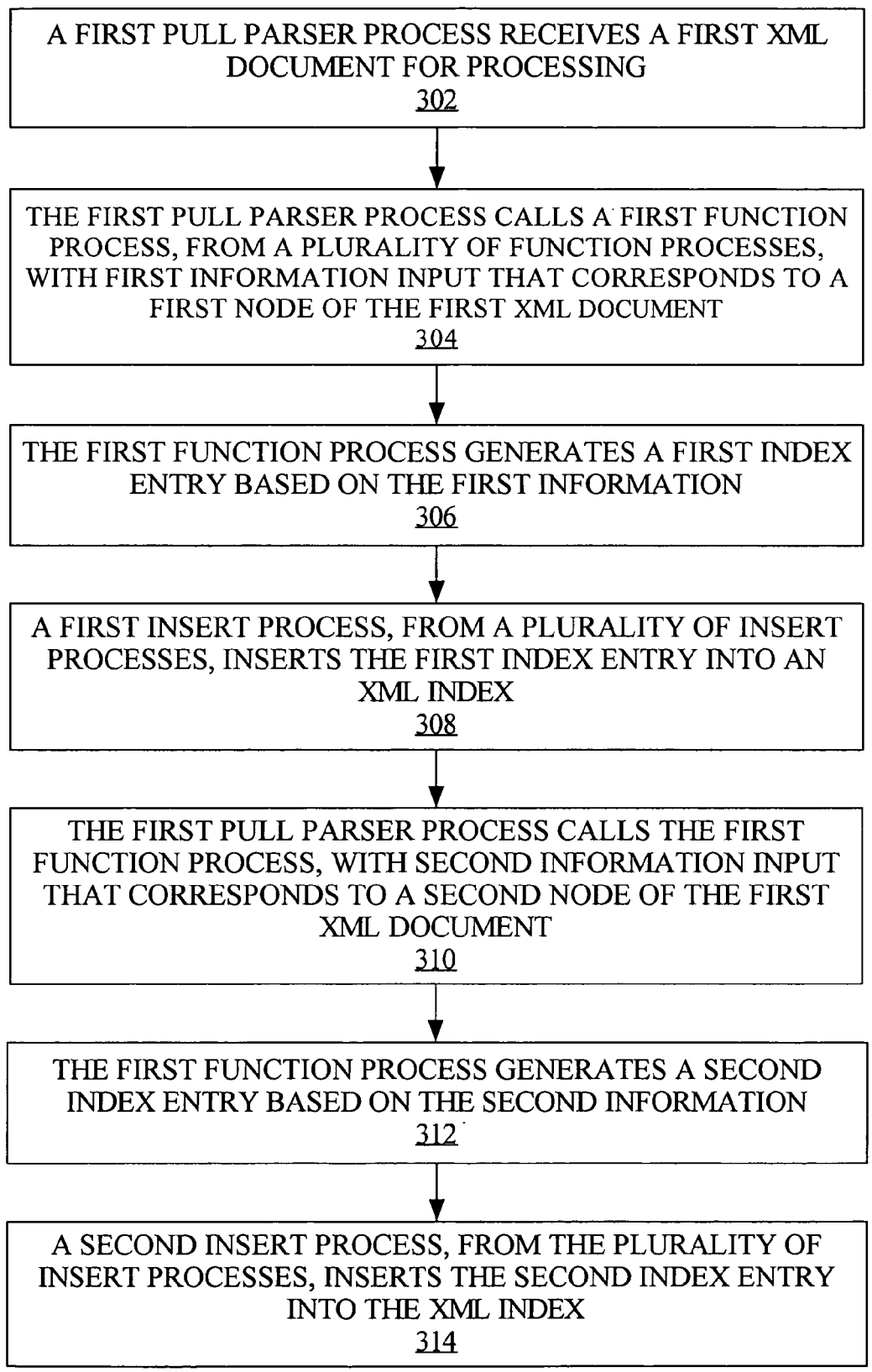
FIGS. 3A and 3B are flow diagrams that illustrate a method for loading an XML index in parallel, according to an embodiment of the invention.
Figure 3B:
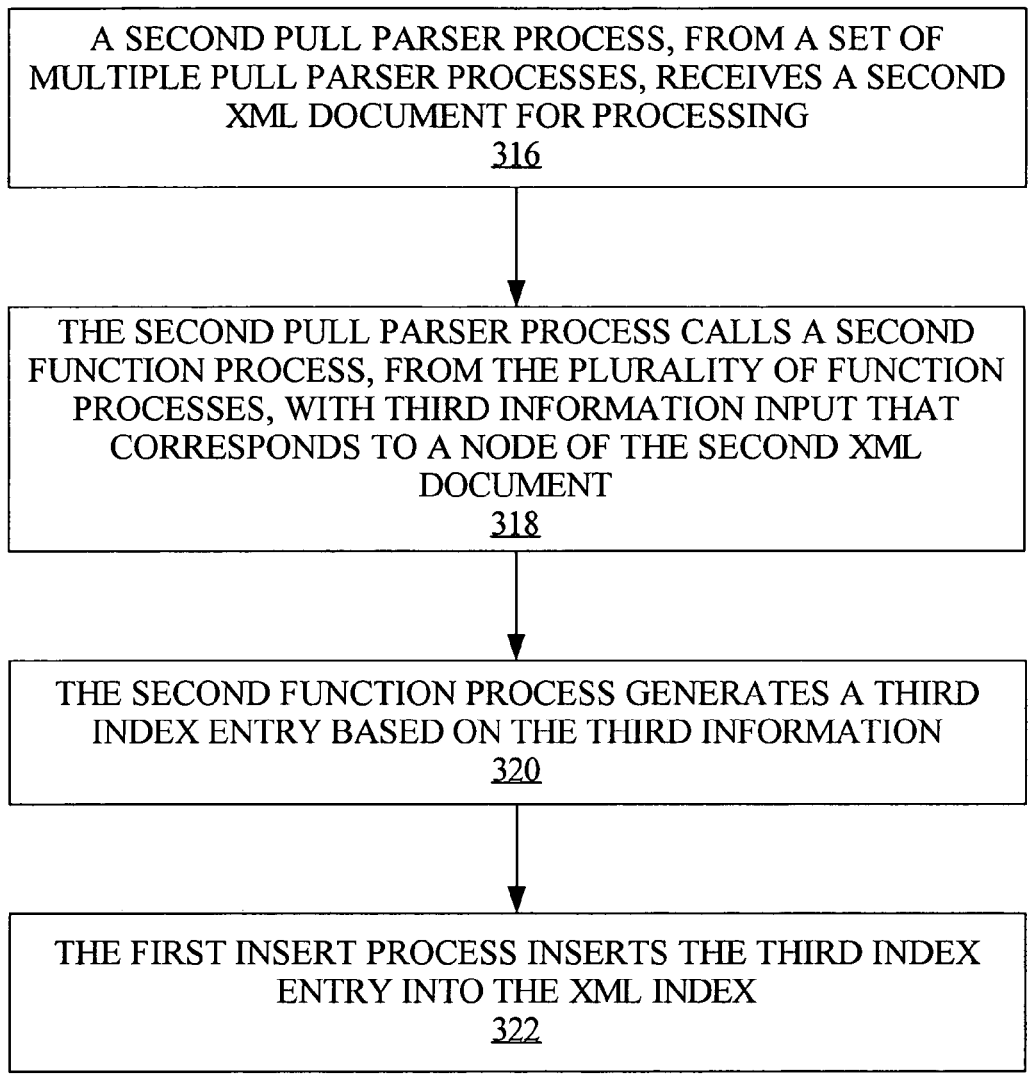

FIGS. 3A and 3B are flow diagrams that illustrate a method for loading an XML index in parallel, according to an embodiment of the invention. The method illustrated in FIGS. 3A and 3B may be performed by executing one or more sequences of instructions by one or more processors, such as within a computer system (e.g., computer system 400 of FIG. 4).

At block 302, a first pull parser process receives a first XML document for processing. For example, parser 214a (FIG. 2) receives an XML document stored in a row of base table 112 (FIG. 2) from scan process S1 (FIG. 2). According to one embodiment, the first pull parser process is the same process as the scan process that scans the base table, such as when multiple XML documents are scanned from the base table in parallel.

At block 304, the first pull parser process calls a first function process, from a set of multiple function processes, with first information that corresponds to a node of the first XML document. This node is at times referred to herein as the 'first' node of the first XML document simply to distinguish this node from other nodes in the same first XML document, but not to mean that this node is the first node in the XML document hierarchical structure. For example, parser 214a (FIG. 2) calls table function 216a (FIG. 2) with input node information about a node in the XML document that the parser 214a process is processing. Significantly, there are multiple 'instances' of the table function for parallel generation of index entries by multiple processes. As mentioned, if the first XML document is the only document being processed by this index load procedure, then the first parser process may function as a master or coordinator process and dispatch different node information from the XML document to different slave processes for execution of a corresponding instance of the function.

At block 306, the first function process generates a first index entry based on the first information. For example, function 216a (FIG. 2) executes with node information extracted from the first XML document passed in as input at block 304, to generate a corresponding index entry (e.g., an entry for a PATH_TABLE as described in the Chandra application).

At block 308, a first insert process, from a plurality of insert processes, inserts the first index entry generated at block 306 into an XML index (e.g., a PATH_TABLE as described in the Chandra application). For example, insert process I1 requests, or pulls, an output from function 216a (FIG. 2) for insertion into XML index 118 (FIG. 2). As mentioned, if multiple XML documents are being processed concurrently, then the scan process S1, parser 214a, table function 216a, and insert process I1 may all be the same process. Otherwise, if only one document is being processed by this index load procedure, then the first parser process may function as a master or coordinator process and dispatch different node information from the XML document to different slave processes for execution of a corresponding instance of the function and for insertion of a resultant entry into the XML index. Alternatively, if only one document is being processed by this index load procedure, then the first parser process may function as a master or coordinator process and dispatch different node information from the XML document to different slave processes for execution of a corresponding instance of the function and dispatch index entries to even more and/or different slave processes for insertion into the XML index.

Hence, blocks 302-308 describe a procedure for loading an XML index in parallel, using multiple table function instances to generate entries for the index, and how various processes may be allocated for processing one XML document at a time (intra-document parallelism) or multiple XML documents concurrently (inter- and perhaps intra-document parallelism). According to one embodiment, intra-document parallelism is described further in reference to blocks 310-314.

Intra-Document Parallelism

At block 310, the first pull parser process calls the first function process with second information that corresponds to another node of the first XML document. This node is at times referred to herein as the 'second' node of the first XML document simply to distinguish this node from other nodes in the same first XML document (e.g., different node from the first node), but not to mean that this node is the second node in the XML document hierarchical structure.

At block 312, the first function process generates a second index entry based on the second information. For example, function 216a (FIG. 2) executes with node information extracted from the first XML document passed in as input at block 310, to generate a corresponding index entry.

At block 314, a second insert process, from the plurality of insert processes, inserts the second index entry generated at block 312 into the XML index. For example, insert process I2 requests, or pulls, an output from function 216a (FIG. 2) for insertion into XML index 118 (FIG. 2). As mentioned, if only one document is being processed by this index load procedure, then the first parser process may function as a master or coordinator process and dispatch different node information from the XML document to different slave processes for execution of a corresponding instance of the function and for insertion of a resultant entry into the XML index. Alternatively, if only one document is being processed, then the first parser process may dispatch different node information from the XML document to different slave processes for execution of a corresponding instance of the function and dispatch index entries to even more and/or different slave processes for insertion into the XML index, such as to insert processes I1 and I2. Furthermore, if multiple documents are being processed concurrently, each of multiple parser processes may dispatch index entries corresponding to respective XML documents to multiple different slave processes for insertion into the XML index, such as to insert processes I1, I2, I3.

Inter-Document Parallelism with Intra-Document Parallelism

According to one embodiment, inter-document parallelism is described further in reference to blocks 316-322 of FIG. 3B, in conjunction with the intra-document parallelism already described in reference to FIG. 3A.

At block 316, a second pull parser process receives a second XML document for processing, where the second pull parser process is a different process from the first pull parser process. For example, parser 214b (FIG. 2) receives an XML document stored in a row of base table 112 (FIG. 2) from scan process S2 (FIG. 2). According to one embodiment, the second pull parser process is the same process as the scan process that feeds the second pull parser with rows from the base table, such as when multiple XML documents are scanned from the base table in parallel.

At block 318, the second pull parser process calls a second function process, from the set of multiple function processes, with third information that corresponds to a node of the second XML document. For example, parser 214b (FIG. 2) calls table function 216b (FIG. 2) with input node information about a node in an XML document that the parser 214b process is processing. Significantly, there are multiple 'instances' of the table function for parallel generation of index entries by multiple processes for multiple XML documents.

At block 320, the second function process generates a third index entry based on the third information. For example, function 216b (FIG. 2) executes with node information extracted from the second XML document passed in as input at block 318, to generate a corresponding index entry.

At block 322, the first insert process inserts the third index entry generated at block 320 into the XML index. For example, insert process I1 requests, or pulls, an output from function 216b (FIG. 2) for insertion into XML index 118 (FIG. 2). The scan process S2, parser 214b, and table function 216b may all be the same process.

Summarily, when the set of XML documents to be indexed is huge, indexing these documents in parallel is advantageous. Likewise, when the size of the documents is large, indexing individual nodes of these XML documents in parallel is further advantageous.

Taking Advantage of Base Table Partitioning

In a more advanced use-case, the base table could be partitioned based on some key designated by the user (e.g., partitioned by year). The table partitions are logically part of the same table but may be stored separated from each other on persistent storage, or even on different storage mechanisms.

In scenarios in which the base table is partitioned, the PATH_TABLE would normally be partitioned in a "equi-partitioned" manner, whereby all nodes belonging to a certain partition in the base table would reside in one corresponding partition of the PATH_TABLE. In such scenarios, the processes performing the inserts into the PATH_TABLE can take advantage of these partitioning schemes. For example, if the number of parallel insert processes matches the number of partitions, each respective process can be allocated to process a particular partition, to efficiently load data without interference from the other processes. Each process can handle one partition and thus achieve optimal use of resources. A partition-to-process mapping may span all the layers of processing (e.g., scan, parse, function, insert), regardless of whether a single process is used for processing a given document throughout all the layers or multiple processes are used to process the given document at different layers. Additionally, multiple insert processes may be allocated for inserting index entries corresponding to a particular partition, thereby providing intra-partition parallelism at the insert layer.

Furthermore, the number of parallel processes to be used for loading the XML index can be configured by the user based on their requirements and hardware capabilities. This degree of parallelism can be specified when the XML index is being created. Similarly, the partitioning information (e.g., the number of partitions, etc.) can also be specified by the user.

Hardware Overview

Figure 4:
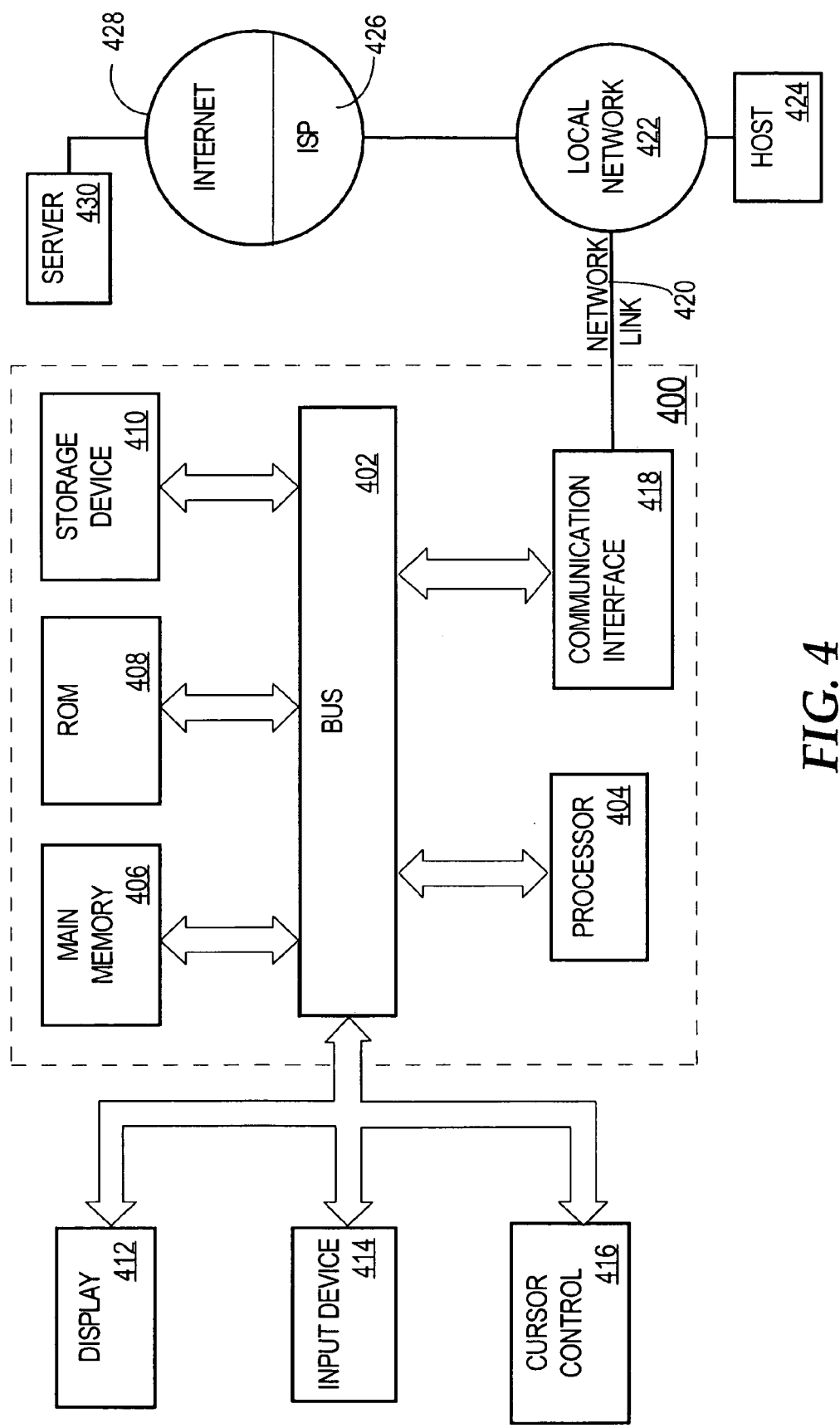
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
a first pull parser process, of a plurality of concurrently running pull parser processes, receiving a first XML document for processing;
the first pull parser process parsing the first XML document and generating first information that corresponds to a first node of said first XML document;
based on said first information, generating first values for a first index entry;
a first insertion process, of a plurality of concurrently executing insertion processes, inserting said first values for said first index entry into an XML data index, wherein inserting said first values creates said first index entry within said XML data index;
wherein the first pull parser and the first insertion process are separate processes that run concurrently;
a second pull parser process, of the plurality of concurrently running pull parser processes, receiving a second XML document for processing;
wherein the second pull parser process and the first pull parser process are separate processes;

the second pull parser process parsing the second XML document and generating second information that corresponds to a second node of said second XML document;

based on said second information, generating second values for a second index entry;

after creating said first index entry within said XML data index, the first insertion process inserting said second values for said second index entry into said XML data index, wherein inserting said second values creates said second index entry within said XML data index;

the first pull parser process parsing the first XML document and generating third information that corresponds to a third node of said first XML document;

based on said third information, generating third values for a third index entry; and after creating said second index entry within said XML data index, the first insertion process inserting said third values for said third index entry into said XML data index, wherein inserting said third values creates said third index entry within said XML data index;

wherein the method is performed by one or more computing devices.

2. The method of claim 1, wherein parsing the first XML document is performed substantially concurrently with parsing the second XML document.

3. The method of claim 1, wherein said first pull parser process calling a first index entry generation function is performed substantially concurrently with said second pull parser process calling a second index entry generation function.

4. The method of claim 1, further including:
said first insertion process calling said first pull parser process to request first values for said first index entry; and
providing said first values for said first index entry to said first insertion process in response to calling said first pull parser process to request said first values for said first index entry;
said first insertion process calling said second pull parser process to request second values for said second index entry; and
providing said second values for said second index entry to said first insertion process in response to calling said second pull parser process to request said second values for said second index entry.

5. The method of claim 1, wherein said first XML document and said second XML document are two of a plurality of XML documents stored in a partitioned database table having a first set of XML documents stored in a first partition of said table and a second set of XML documents stored in a second partition of said table, and wherein said first pull parser process is allocated to process said first partition and said second pull parser process is allocated to process said second partition.

6. The method of claim 1, further comprising:
said first pull parser process parsing said first XML document and generating fourth information that corresponds to a fourth node of said first XML document;
based on said fourth information, generating fourth values for a fourth index entry;
a second insertion process, of said plurality of concurrently executing insertion processes, inserting said fourth values for said fourth index entry into said XML data index, wherein said second insertion process is a different process from said first insertion process.

7. The method of claim 6, wherein said second insertion process inserting said fourth values for said fourth index entry into said XML data index and said first insertion process inserting said first values for said first index entry into said XML data index are performed substantially concurrently.

8. The method of claim 6, wherein said first XML document and said second XML document are two of a plurality of XML documents stored in a partitioned database table having a first set of XML documents stored in a first partition of said table and a second set of XML documents stored in a second partition of said table, and wherein said first pull parser process is allocated to process said first partition and said second pull parser process is allocated to process said second partition.

9. The method of claim 8, wherein said first insertion process is allocated to insert into said XML index entries corresponding to said first and second partitions.

10. The method of claim 6, further comprising:
calling a first index entry generation function with first information utilizing a first cursor instance; and
calling a second index entry generation function with second information utilizes a second cursor instance.

11. The method of claim 10, wherein said first pull parser process and said first index entry generation function execute within a same process.

12. The method of claim 10, wherein said first pull parser process is a coordinator process and said first index entry generation function and said first insertion process execute within a same slave process from a plurality of slave processes.

13. The method of claim 10, wherein calling said index entry generation function includes calling said index entry generation function using a cursor type of interface with said first XML document and said index entry generation function.

14. A computer-readable volatile or non-volatile medium storing one or more sequences of instructions which, when executed by one or more processors, causes the one or more processors to perform:
a first pull parser process, of a plurality of concurrently running pull parser processes, receiving a first XML document for processing;
the first pull parser process parsing the first XML document and generating first information that corresponds to a first node of said first XML document;
based on said first information, generating first values for a first index entry;
a first insertion process, of a plurality of concurrently executing insertion processes, inserting said first values for said first index entry into said a XML data index, wherein inserting said first values creates said first index entry within said XML data index;
wherein the first pull parser and the first insertion process are separate processes that run concurrently;
a second pull parser process, of the plurality of concurrently running pull parser processes, receiving a second XML document for processing;
wherein the second pull parser process and the first pull parser process are separate processes;
the second pull parser process parsing the second XML document and generating second information that corresponds to a second node of said second XML document;
based on said second information, generating second values for a second index entry;
after creating said first index entry within said XML data index, the first insertion process inserting said second values for said second index entry into said XML data index, wherein inserting said second values creates said second index entry within said XML data index;

the first pull parser process parsing the first XML document and generating third information that corresponds to a third node of said first XML document;

based on said third information, generating third values for a third index entry; and after creating said second index entry within said XML data index, the first insertion process inserting said third values for said third index entry into said XML data index, wherein inserting said third values creates said third index entry within said XML data index.

15. The computer-readable volatile or non-volatile medium as recited in claim 14, wherein parsing the first XML document is performed substantially concurrently with parsing the second XML document.

16. The computer-readable volatile or non-volatile medium as recited in claim 14, wherein a first index entry generation function is performed substantially concurrently with said second pull parser process calling a second index entry generation function.

17. The computer-readable volatile or non-volatile medium as recited in claim 14, further including instructions which when executed cause the processors to perform:

said first insertion process calling said first pull parser process to request first values for said first index entry; and providing said first values for said first index entry to said first insertion process in response to calling said first pull parser process to request said first values for said first index entry;

said first insertion process calling said second pull parser process to request second values for said second index entry; and providing said second values for said second index entry to said first insertion process in response to calling said second pull parser process to request said second values for said second index entry.

18. The computer-readable volatile or non-volatile medium as recited in claim 14, wherein said first XML document and said second XML document are two of a plurality of XML documents stored in a partitioned database table having a first set of XML documents stored in a first partition of said table and a second set of XML documents stored in a second partition of said table, and wherein said first pull parser process is allocated to process said first partition and said second pull parser process is allocated to process said second partition.

19. The computer-readable volatile or non-volatile medium as recited in claim 14, further including instructions which when executed cause the one or more processors to perform:

said first pull parser process parsing said first XML corresponds to a fourth node of said first XML document;

based on said fourth information, generating fourth values for a fourth index entry, and a second insertion process, of said plurality of concurrently executing insertion processes, inserting said fourth values for said fourth index entry into said XML data index, wherein said second insertion process is a different process from said first insertion process.

20. The computer-readable volatile or non-volatile medium as recited in claim 19, wherein said second insertion process inserting said fourth values for said fourth index entry into said XML data index substantially concurrently with said first insertion process inserting said first values for said first index entry into said XML data index.

21. The computer-readable volatile or non-volatile medium as recited in claim 19, wherein said first XML document and said second XML document are two of a plurality of XML documents stored in a partitioned database table having a first set of XML documents stored in a first partition of said table and a second set of XML documents stored in a second partition of said table, and wherein said first pull parser process is allocated to process said first partition and said second pull parser process is allocated to process said second partition.

22. The computer-readable volatile or non-volatile medium as recited in claim 21, wherein said first insertion process is allocated to insert into XML index entries corresponding to said first and second partitions.

23. The computer-readable volatile or non-volatile medium as recited in claim 19, further including instructions which when executed cause the processors to perform:

calling a first index entry generation function with first information utilizing a first cursor instance; and calling a second index entry generation function with second information utilizes a second cursor instance.

24. The computer-readable volatile or non-volatile medium as recited by claim 23, wherein said first pull parser process and said first index entry generation function execute within a same process.

25. The computer-readable volatile or non-volatile medium as recited by claim 23, wherein said first pull parser process is a coordinator process and said first index entry generation function and said first insertion process execute within a same slave process from a plurality of slave processes.

26. The computer-readable volatile or non-volatile medium as recited by claim 23, wherein calling said index entry generation function includes calling said index entry generation function using a cursor type of interface with said first XML document and said index entry generation function.

* * * * *

UNITED STATES PATENT AND TRADEMARK OFFICE
CERTIFICATE OF CORRECTION

PATENT NO. : 7,680,764 B2  Page 1 of 1
APPLICATION NO. : 11/472837
DATED : March 16, 2010
INVENTOR(S) : Sivansankaran Chandrasekar et al.

It is certified that error appears in the above-identified patent and that said Letters Patent is hereby corrected as shown below:

In column 8, line 30, delete "11" and insert -- I1 --, therefor.

In column 9, line 8, delete "12" and insert -- I2 --, therefor.

In column 9, line 62, delete "11" and insert -- I1 --, therefor.

In column 13, line 62, in claim 6, after "entry;" insert -- and --.

In column 14, line 16, in claim 9, after "into" delete "said".

In column 14, line 50, in claim 14, after "into" delete "said".

In column 16, line 1, in claim 19, after "XML" insert -- document and generating fourth information that --.

Signed and Sealed this

Twenty-first Day of September, 2010

David J. Kappos
*Director of the United States Patent and Trademark Office*